United States Patent
Sim

(10) Patent No.: US 9,282,310 B2
(45) Date of Patent: Mar. 8, 2016

(54) MOBILE TERMINAL AND CONTROL METHOD THEREOF

(71) Applicant: LG Electronics Inc., Seoul (KR)

(72) Inventor: Jungsub Sim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 379 days.

(21) Appl. No.: 13/680,346

(22) Filed: Nov. 19, 2012

(65) Prior Publication Data

US 2013/0188021 A1    Jul. 25, 2013

(30) Foreign Application Priority Data

Jan. 20, 2012   (KR) .................. 10-2012-0006856

(51) Int. Cl.
| | |
|---|---|
| *H04N 13/00* | (2006.01) |
| *H04N 13/04* | (2006.01) |
| *G09G 3/00* | (2006.01) |
| *G06T 15/00* | (2011.01) |
| *H04N 13/02* | (2006.01) |

(Continued)

(52) U.S. Cl.
CPC ............ *H04N 13/0022* (2013.01); *G06T 15/00* (2013.01); *G09G 3/003* (2013.01); *H04N 13/0007* (2013.01); *H04N 13/0018* (2013.01); *H04N 13/0033* (2013.01); *H04N 13/0055* (2013.01); *H04N 13/0203* (2013.01); *H04N 13/0497* (2013.01); *H04N 21/41407* (2013.01); *H04N 21/4532* (2013.01); *H04N 21/816* (2013.01); *G09G 2310/0275* (2013.01)

(58) Field of Classification Search
CPC .......... H04N 13/0022; H04N 13/0055; H04N 13/0018; H04N 13/0497; H04N 13/0007; H04N 13/0033; H04N 13/0203; H04N 21/41407; H04N 21/4532; H04N 21/816; G09G 2310/0275; G09G 3/003; G06T 15/00
USPC ............. 345/204–214, 690–699, 419; 348/46
See application file for complete search history.

(56) References Cited

U.S. PATENT DOCUMENTS

| | | | |
|---|---|---|---|
| 6,529,209 B1 * | 3/2003 | Dunn et al. ................... | 345/629 |
| 6,552,753 B1 * | 4/2003 | Zhurbinskiy et al. ......... | 348/738 |

(Continued)

FOREIGN PATENT DOCUMENTS

| | | |
|---|---|---|
| EP | 2 299 728 A2 | 3/2011 |
| EP | 2 309 764 A1 | 4/2011 |
| EP | 2 315 452 A2 | 4/2011 |

OTHER PUBLICATIONS

European Search Report dated Sep. 29, 2014 issued in Application No. 12 007 970.2.

*Primary Examiner* — Dmitriy Bolotin
(74) *Attorney, Agent, or Firm* — Ked & Associates, LLP

(57) ABSTRACT

A mobile terminal and a control method of the mobile terminal are disclosed. A mobile terminal and a control method of the mobile terminal according to the present invention comprises a memory storing captured stereoscopic images; a display displaying the stored stereoscopic images; and a controller obtaining at least one information of a user viewing the display and changing attributes of the stereoscopic images according to the obtained information of the user and displaying the attribute-changed images. The present invention, by changing attributes of stereoscopic images according to obtained information of a user and displaying the attribute-changed images, can provide stereoscopic images optimized to a user watching a display apparatus.

16 Claims, 18 Drawing Sheets

(51) Int. Cl.
*H04N 21/414* (2011.01)
*H04N 21/45* (2011.01)
*H04N 21/81* (2011.01)

(56) References Cited

U.S. PATENT DOCUMENTS

| | | |
|---|---|---|
| 6,590,618 B1 * | 7/2003 | Park et al. .................. 348/734 |
| 2006/0139447 A1 * | 6/2006 | Unkrich .......................... 348/51 |
| 2011/0013888 A1 * | 1/2011 | Sasaki et al. .................. 386/353 |
| 2011/0013890 A1 | 1/2011 | Sasaki et al. .................. 386/357 |
| 2011/0150421 A1 * | 6/2011 | Sasaki et al. .................. 386/241 |
| 2011/0285820 A1 * | 11/2011 | Bittner ............... H04N 13/0445 348/46 |
| 2011/0292186 A1 | 12/2011 | Okuda et al. .................... 348/51 |
| 2012/0214590 A1 * | 8/2012 | Newhouse et al. ............. 463/31 |
| 2012/0281070 A1 * | 11/2012 | Seki et al. ........................ 348/43 |
| 2014/0132744 A1 * | 5/2014 | Wu ................... H04N 13/0033 348/55 |

* cited by examiner

FIG. 12

| Profile | | |
|---|---|---|
| U1 | Age<br>Sex<br>Name | 21<br>Male<br>Tom |
| U2 | Age<br>Sex<br>Name | 8<br>Male<br>John |

(a)

| Table | |
|---|---|
| Age | Distance |
| 5 | a |
| 8 | b |
| 12 | c |
| ⋮ | ⋮ |
| 21 | d |
| ⋮ | ⋮ |

| Channel | | Restrict |
|---|---|---|
| Ch 5 | SBS | None |
| Ch 9 | KBS | None |
| Ch 11 | MBC | None |
| ⋮ | ⋮ | ⋮ |
| Ch 35 | PLAY BOY | Under 19 |

MOBILE TERMINAL AND CONTROL METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2012-0006856, filed on Jan. 20, 2012, the contents of which are incorporated by reference herein in their entirety.

BACKGROUND OF THE INVENTION

1. Field of the Invention

The present invention relates to a mobile terminal and more particularly, a display apparatus capable of providing optimized stereoscopic images to a user watching the display apparatus by changing attributes of stereoscopic images and displaying the attribute-changed stereoscopic images according to obtained information about the user and a control method thereof.

2. Discussion of the Related Art

As functions of terminals such as personal computers, laptop computers, cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable.

Also, mobile terminals capable of displaying stereoscopic images are being released to the market.

SUMMARY OF THE INVENTION

The present invention relates to a mobile terminal and a control method of the mobile terminal, capable of providing optimized stereoscopic images to a user watching a display apparatus by changing attributes of stereoscopic images and displaying the attribute-changed stereoscopic images according to obtained information of the user.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIGS. 10 to 12 illustrate a method of identifying information of a user operating a display apparatus of FIG. 8;

FIG. 15 shows restrictions applied to particular broadcasting programs;

DETAILED DESCRIPTION OF THE INVENTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

Figure 1:
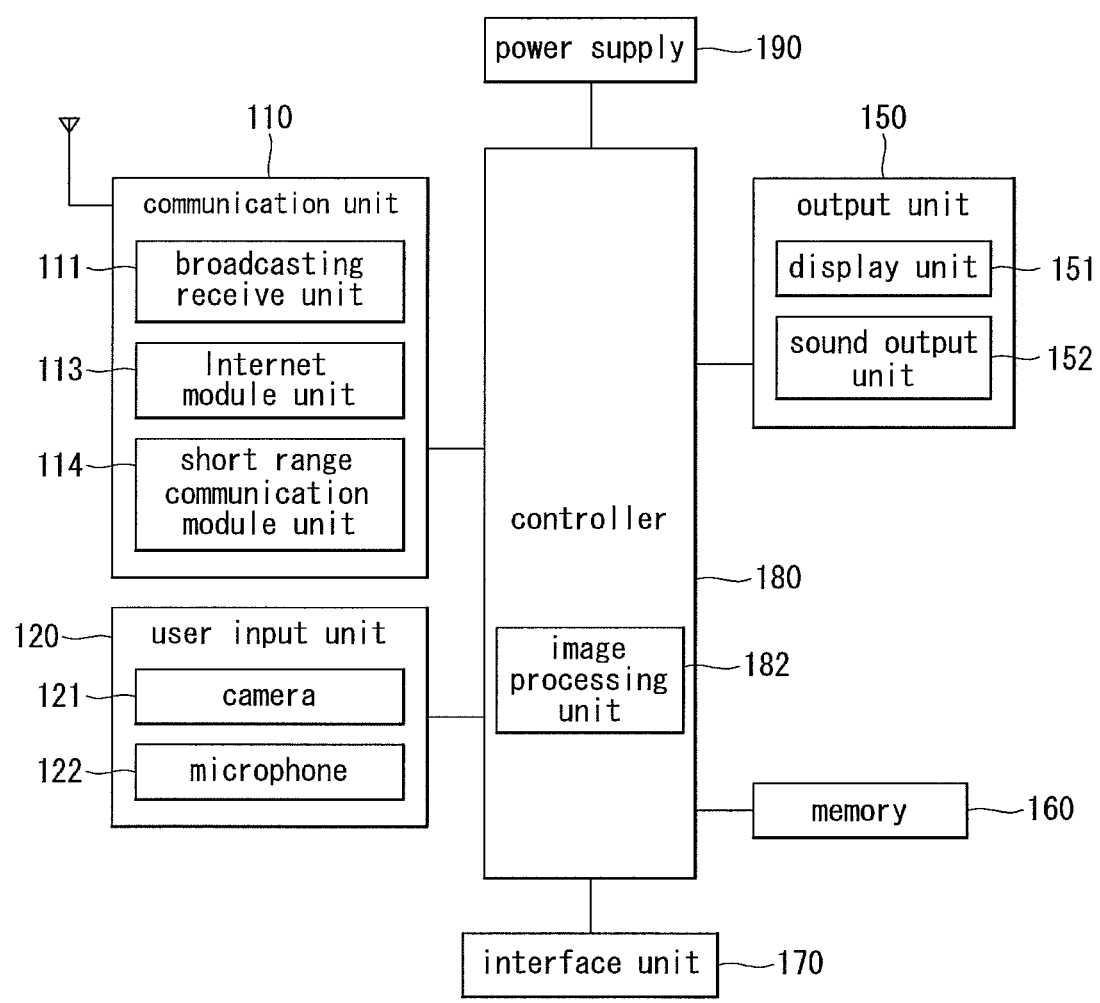
FIG. 1 is a block diagram of a mobile terminal according to an embodiment.

FIG. 1 is a block diagram of a mobile terminal according to an embodiment.

As shown in FIG. 1, a display apparatus 100 according to one embodiment of the present invention comprises a communication unit 110, a user input unit 120, an output unit 150, a memory 160, an interface unit 170, a controller 180, and a power supply 190. The components illustrated in FIG. 1 are those commonly found in a display apparatus 100. In this sense, it is equally possible to implement a display apparatus 100 incorporating much more or less components than that of FIG. 1.

The communication unit 110 may include one or more modules which enable communication between the display apparatus 100 and a communication system or between the display apparatus 100 and other devices. For example, the communication unit 110 may include a broadcasting receive unit 111, an Internet module unit 113, a short range communication module unit 114 and so on.

The broadcasting receive unit 111 receives a broadcasting signal and/or broadcasting-related information from an external broadcasting management server through a broadcasting channel.

The broadcasting channels consist of satellite and terrestrial channels. The broadcasting management server may denote a server generating and transmitting broadcasting signals and/or broadcasting-related information; or a server receiving generated broadcasting signals and/or broadcasting-related information and transmitting the signals and/or information to a terminal. The broadcasting signals consist not only of TV broadcasting signals, radio broadcasting signals, and data broadcasting signals but also broadcasting signals in the form of the TV broadcasting signal or the radio broadcasting signal combined with the data broadcasting signal.

The broadcasting-related information corresponds to information related to broadcasting channels, broadcasting programs, or broadcasting service providers. The broadcasting-related information can be provided through a communication network.

The broadcasting-related information can be provided in various ways. EPG (Electronic Program Guide) used for DMB (Digital Multimedia Broadcasting) or ESG (Electronic Service Guide) used for DVB-H (Digital Video Broadcast-Handheld) is a good example of the broadcasting-related information.

The broadcasting receive unit 111 can receive broadcasting signals by using various kinds of broadcasting systems. Broadcasting signals and/or broadcasting-related information received through the broadcasting receive unit 111 is stored in the memory 160.

The Internet module unit 113 denotes a module intended for Internet connection. The Internet module unit 113 may be implemented inside or outside of the display apparatus 100.

The short range module unit 114 denotes a module meant for short range communication. Bluetooth, RFID (Radio Frequency Identification), IrDA (Infrared Data Association), UWB (Ultra Wideband), ZigBee, and so on may be employed for short range communication technology.

The user input unit 120 is intended for receiving audio or video signals, including a camera 121, a microphone 122, and so on.

The camera 121 processes still images or video frames obtained by an image sensor at a capture mode or a video communication mode, respectively. The image frames processed can be displayed on the display unit 151. The camera 121 may correspond to a camera capable of capturing 2D or 3D images; a single 2D or 3D camera or a combination thereof may comprise the camera 121.

Image frames processed by the camera 121 may be stored in the memory 160 or transmitted to the outside through the communication unit 110. Two or more cameras 121 may be installed according to the configuration of the display apparatus 100.

The microphone 122 receives external sound signals at a communication mode, a recording mode, or a voice recognition mode and converts the signals into electrical voice data. The microphone 122 may make use of various noise-cancelling algorithms to remove noise which may be generated while receiving external sound signals.

The output unit 150 includes a display unit 151 and a sound output unit 152.

The display unit 151 displays information processed in the display apparatus 100. For example, the display unit 151 displays a user interface (UI) or a graphic user interface (GUI) related to the display apparatus 100. The display unit 151 is implemented by at least one of liquid crystal display, thin film transistor-liquid crystal display, organic light-emitting diode, flexible display, and 3D display. Also, the display unit 151 may be realized as a transparent or light penetration type. This kind of display apparatus may be called a transparent display, where a typical example of transparent display is a transparent LCD. The rear structure of the display unit 151 can also be implemented by utilizing the light penetration type structure. Due to the above structure, the user can see an object located in the rear side of his or her terminal body through the region occupied by the display unit 151 of the terminal body.

Depending on an implementation method of the display apparatus 100, two or more display units 151 can be employed. For example, a plurality of display units 151 may be disposed in a single surface being separated from each other or in the form of a single body; also, the display units 151 may be disposed on different surfaces from each other.

In case the display unit 151 and a sensor sensing a touch motion (hereinafter, it is called a 'touch sensor') form layer structure (hereinafter, it is called a 'touch screen'), the display unit 151 may also be used as an input apparatus in addition to an output apparatus. For example, the touch sensor can be realized in various forms such as a touch film, a touch sheet, a touch pad, and so on.

The touch sensor can be configured to convert pressure applied to a particular position of the display unit 151 or variation of capacitance generated at a particular position of the display unit 151 into an electrical input signal. The touch sensor can be configured to detect not only the position and area of touch but also pressure applied at the time of touch.

In case a touch input is sensed by the touch sensor, the signal corresponding to the touch input is sent to a touch controller. The touch controller processes the signal and sends the corresponding data to the controller 180. In this way, the controller 180 gets to know which part of the display unit 151 has been touched.

The sound output unit 152 outputs audio data received from the communication unit 110 or stored in the memory 160. The sound output unit 152 outputs sound signals related to the functions carried out inside the display apparatus (for example, a call signal receive sound, a message receive sound, and so on). The sound output unit 152 may include a receiver, speaker, a buzzer, and so on.

The memory 160 stores programs for operating the controller 180; the memory 160 temporarily stores input/output data (for example, a phonebook, message, still image, video, and so on). The memory 160 stores data related to various patterns of vibration and sound output at the time of touch input on the touch screen.

The memory 160 includes at least one of flash memory type, hard disk type, multimedia card micro type, card type memory (for example, SD or XD memory), RAM (Random Access Memory), SRAM (Static Random Access Memory), ROM (Read-Only Memory), EEPROM (Electrically Erasable Programmable Read-Only Memory), PROM (Programmable Read-Only Memory), a magnetic memory, a magnetic disk, and an optical disk. The display apparatus 100 may operate in association with a web storage on the Internet carrying out the storage function of the memory 160.

The interface unit 170 functions as a passage to all the external devices connected to the display apparatus 100. The interface unit 170 receives data from an external device or power is supplied to the interface unit 170. The interface unit 170 delivers the data or the power to each component inside the display apparatus 100 or transmits data inside the display apparatus 100 to the external device. For example, the interface unit 170 may include a wired/wireless headset port, an external charging port, a wired/wireless data port, a memory card port, a port connecting to a device equipped with an identifying module, an audio I/O (Input/Output) port, a video I/O port, an earphone port and so on.

A conventional role of the controller 180 is controlling the overall operation of the display apparatus. For example, the controller 180 carries out control and processing related to voice, data, and video communication. The controller 180 may be equipped with an image processing unit 182 for processing images. The image processing unit 182 will be described in detail later at the corresponding part of the document.

The power supply 190 receives external and internal power according to control of the controller 180 and provides power required for operating each component.

Various embodiments disclosed in this document can be realized in a recording medium which can be read out by a computer or a similar device by using software, hardware, or a combination of both. As for hardware-oriented implementation, embodiments of the present invention may be realized by using at least one of ASICs (application specific integrated circuits), DSPs (digital signal processors), DSPDs (digital signal processing devices), PLDs (programmable logic devices), FPGAs (field programmable gate arrays), processors, controllers, micro-controllers, microprocessors, and electric units designed for carrying out functions. In some cases, the embodiments may be realized by the controller 180.

As for software-oriented implementation, embodiments related to a procedure or a function can be realized together with a separate software module which enables at least one function or operation. Software programs are realized by a software application written in an appropriate programming language. Also, software programs can be stored in the memory 160 and carried out by the controller 180.

FIGS. 2 to 7 illustrate a method of displaying stereoscopic images using binocular parallax related to embodiments of the present invention.

Binocular parallax or stereo disparity refers to the difference between image locations of an object as seen by the left and right eye of the human. If the image seen by the left eye and the image seen by the right eye are synthesized in the brain, the synthesized image provides a sense of depth to the human. In what follows, stereoscopic vision refers to impression of depth due to stereo disparity and stereoscopic image refers to an image generating the stereoscopic vision. Also, if a particular object included in an image causes stereoscopic vision, the corresponding object is called a stereoscopic object.

A method of displaying a stereoscopic image due to stereoscopic disparity can be classified into a glasses-type stereoscopy which requires special glasses and auto-stereoscopy which does not require glasses. Glasses-type stereoscopy includes a method using glasses with color filters showing wavelength selectivity, a method using polarized glasses employing a light blocking effect due to polarization difference, and a method using time sharing glasses alternating the left and right image within the afterimage of the human eye. Besides, there is a method of obtaining a sense of depth about motion in the left and right direction according to a time difference in the human visual system originating from the corresponding difference of transmittance by installing filters with transmittance different from each other in the left and right side of the glasses.

Meanwhile, auto-stereoscopy, where a sense of depth is developed on an image display surface rather than in a viewer's side, includes a parallax barrier method, lenticular lens method, and a microlens array method.

Figure 2:
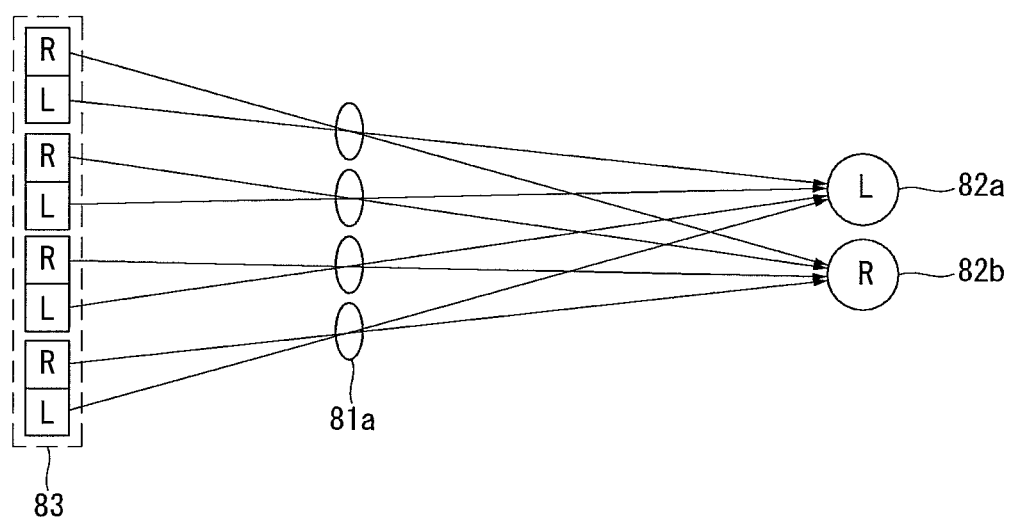
FIGS. 2 to 7 illustrate a method of displaying stereoscopic images using binocular parallax related to embodiments of the present invention.

With reference to FIG. 2, the display module 151 for displaying a stereoscopic image comprises a lenticular lens array 81a. The lenticular lens array 81a, located between a screen 83 comprising pixels L to be incident on the left eye 82a and pixels R to be incident on the right eye 82b arranged in an alternate fashion along a horizontal direction and the left and right eye 82a, 82b, provides an optical directivity for the pixels L incident on the left eye 82a and the pixels R incident on the right eye 82b. Accordingly, an image passing through the lenticular lens array 81a is observed separately by the left 82a and the right eye 82b; the human brain combines the images viewed through the left 82a and the right eye 82b, providing a stereoscopic image.

Figure 3:
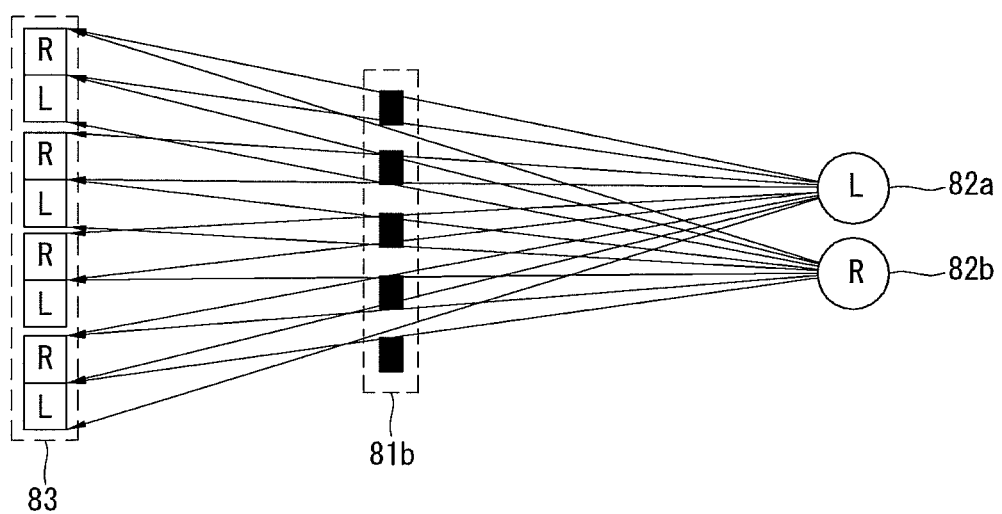

With reference to FIG. 3, the display module 151 for displaying stereoscopic images comprises a parallax barrier 81b in the shape of vertical grids. The parallax barrier 81b, located between a screen 83 comprising pixels L to be incident on the left eye 82a and pixels R to be incident on the right eye 82b arranged in an alternate fashion along a horizontal direction and the left and right eye 82a, 82b, allows an image to be viewed separately by the left 82a and the right eye 82b through apertures in the shape of vertical grids. Therefore, the human brain combines the images viewed by the left 82a and the right eye 82b, thereby observing stereoscopic images. The parallax barrier 81b described above is activated and separates an incident view only if stereoscopic images are to be displayed, whereas, if a two-dimensional image is to be displayed, the parallax barrier 81b is turned off and an incident view passes through, without being separated.

Meanwhile, the methods described above have been introduced to describe embodiments of the present invention and the present invention is not limited to the above. The present invention can display stereoscopic images based on stereoscopic disparity developed from various other methods in addition to the methods described above.

Figure 4:
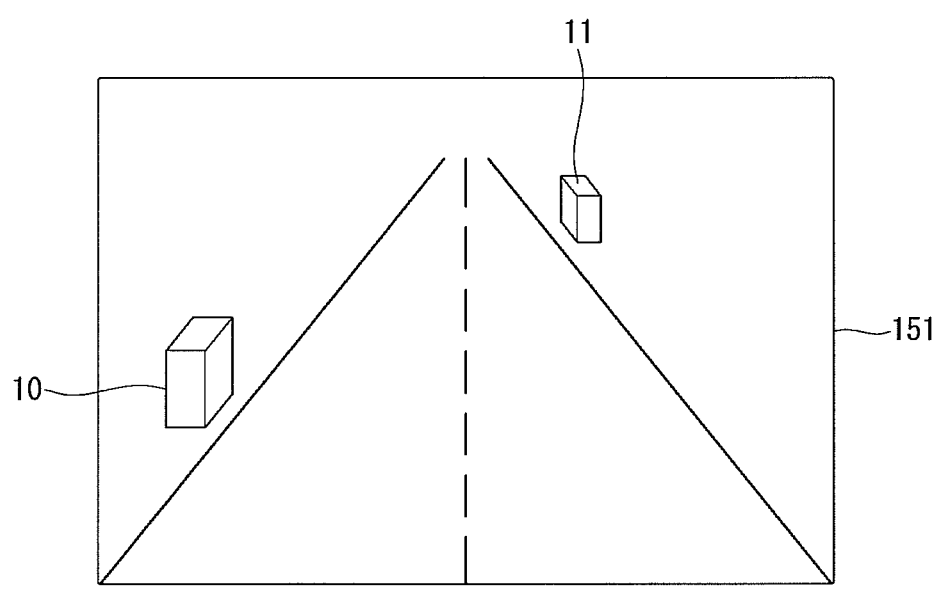

FIG. 4 illustrates an example of displaying a stereoscopic image containing a plurality of image objects 10, 11.

For example, the stereoscopic image shown in FIG. 4 may have been obtained by the camera 121. The stereoscopic image includes a first image object 10 and a second image object 11. At this time, for the convenience of description, two image objects 10, 11 are employed; in reality, however, much more image object can be included in the stereoscopic image.

The controller 180 can display images captured by the camera 121 in real-time on the display unit 151 in the form of camera preview.

The controller 180 can obtain at least one stereo disparity corresponding to the at least one image object.

In case the camera 121 is a 3D camera capable of obtaining the left and right-eye image, the controller 180 can obtain stereoscopic disparity of the first 10 and the second image object 11 based on the left and the right-eye image captured through the camera 121.

Figure 5:
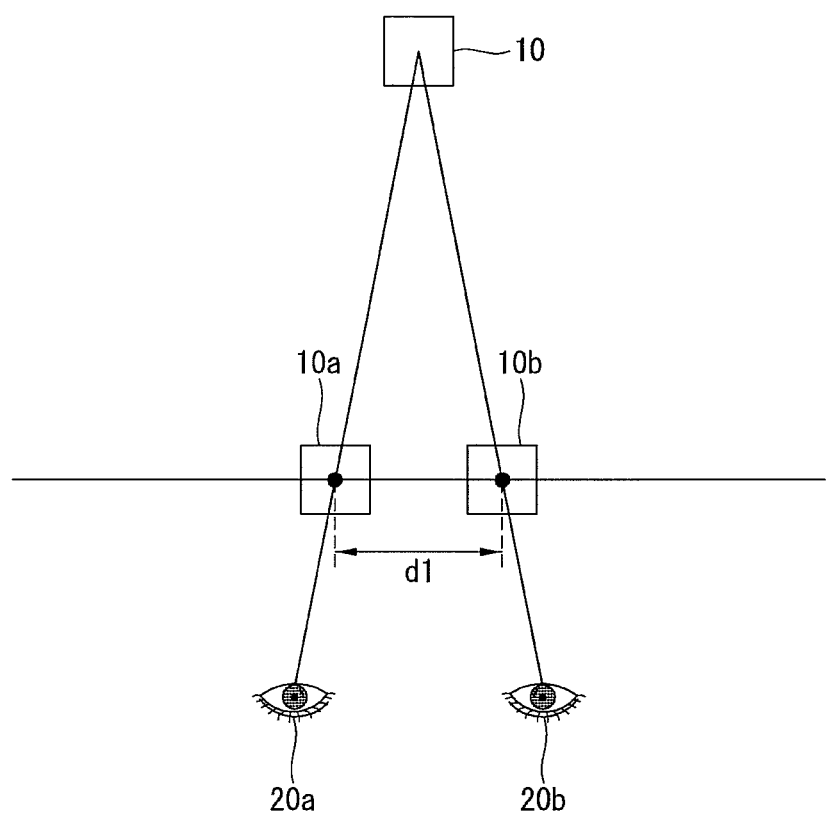

FIG. 5 illustrates stereo disparity of an image object included in a stereoscopic image.

For example, with reference to FIG. 5, the first image object 10 consists of the left eye image 10a viewed by the user's left eye 20a and the right eye image 10b viewed by the user's right eye 20b.

The controller 180 obtains the stereo disparity d1 corresponding to the first image object 10 through the left 10a and the right eye image 10b.

Meanwhile, in case where the camera 121 is a 2D camera, the controller 180, by using a predetermined algorithm which converts a 2D image into a 3D image, converts 2D images captured by the camera 121 into 3D images and displays them on the display unit 151.

Also, the controller 180, by using the image conversion algorithm and the left and the right eye image generated, obtains the stereo disparity of the first image object 10 and the stereo disparity of the second image object 11.

Figure 6:
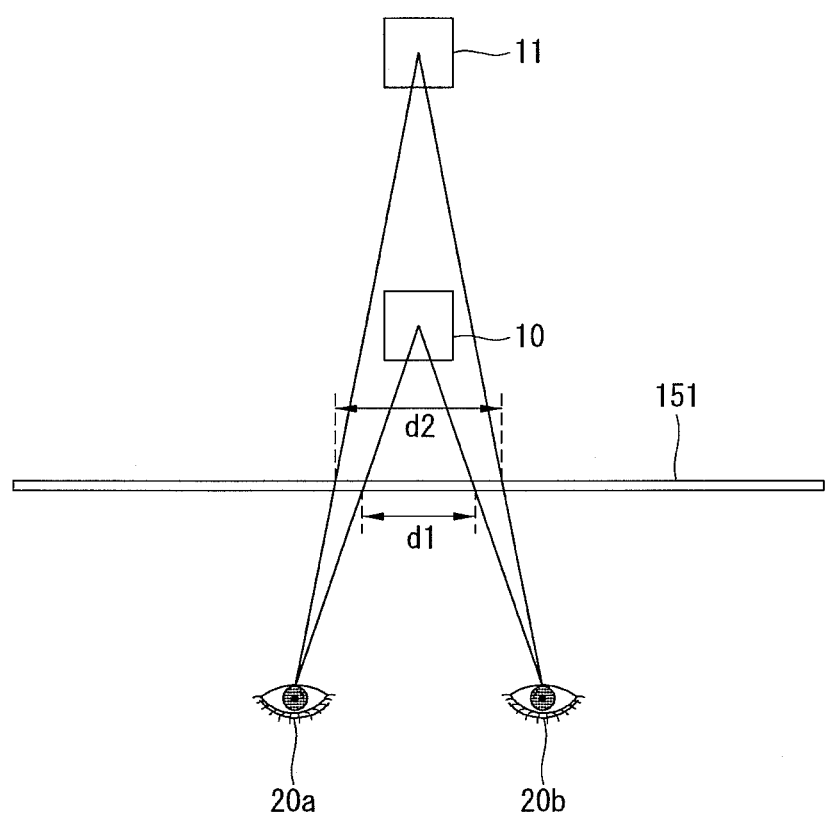

FIG. 6 illustrates comparing stereo disparities of image objects 10, 11 shown in FIG. 4.

With reference to FIG. 6, the stereo disparity d1 of the first image object 10 and the stereo disparity d2 of the second image object 11 are different from each other. Also, as shown in FIG. 6, since d2 is larger than d1, the second image object 11 looks more distant from the user than the first image object 10.

The controller 180 can obtain at least one graphic object corresponding to the at least one image object S120. And the controller 180 can control the display unit 151 to have a stereo disparity corresponding to the at least one graphic object obtained.

Figure 7:
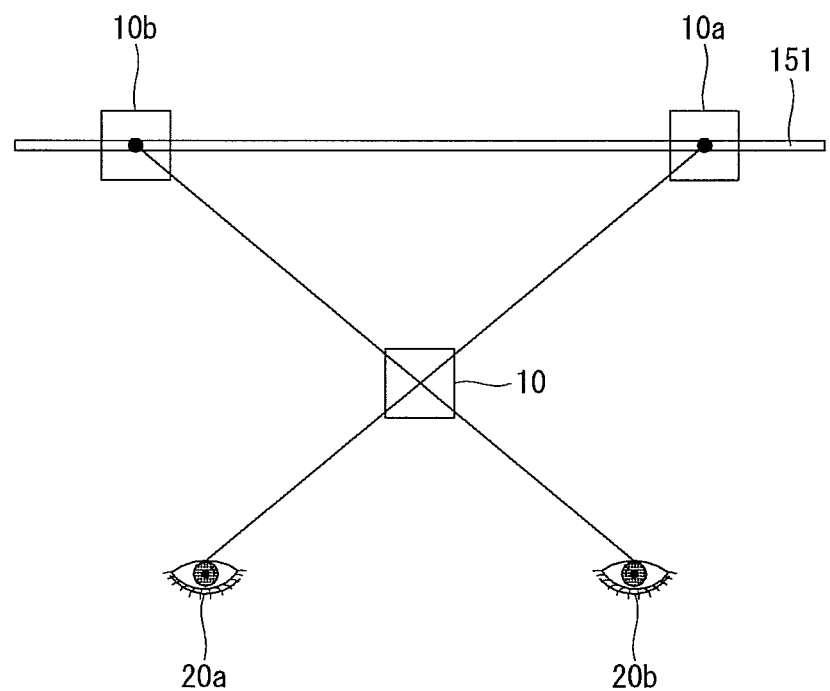

FIG. 7 shows a first image object 10 on the display unit 151 perceived as protruding toward the user. As shown in the figure, the position of the left 10*a* and the right eye image 10*b* on the display unit 151 are displayed in reverse to the case of FIG. 5. If the position of the left eye image 10*a* and the position of the right eye image 10*b* are displayed inversely, the left 20*a* and the right eye 20*b* are made to receive images in the opposite direction to each other. Therefore, the user feels as if the first image object 10 is displayed in the front of the display unit 151, corresponding to the point where the lines of sight intersect. In other words, the user is made to perceive a positive depth with respect to the display unit 151. The current configuration is different from the case of FIG. 5 where the user perceives a negative depth which evokes a feeling that the first image object 10 is located in the rear of the display unit 151.

The controller 180, depending on the user's needs, enables the user to feel various steps of depth sensation by displaying stereoscopic images of a positive or negative depth.

Figure 8:
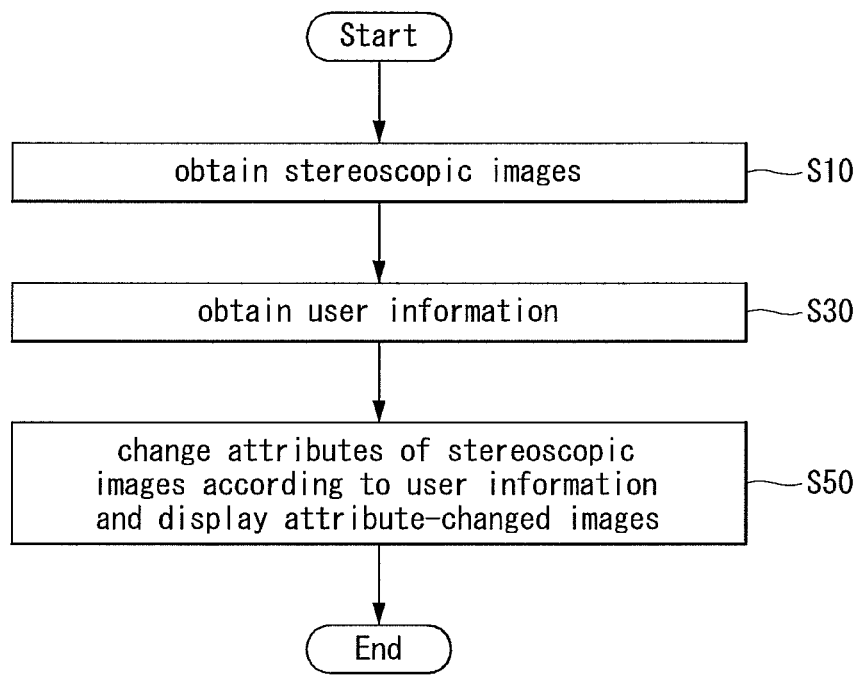
FIG. 8 is a flowchart illustrating operation of a display apparatus of FIG. 1.

FIG. 8 is a flowchart illustrating operation of a display apparatus of FIG. 1.

As shown in the figure, the controller 180 of a display apparatus 100 according to one embodiment of the present invention carries out the step of obtaining a stereoscopic image S10.

A stereoscopic image, as described above, may correspond to an image displayed providing an impression of positive and/or negative depth with respect to a physical position of the display 151 due to the stereo disparity effect.

The stereoscopic image can be obtained in various ways. For example, the display apparatus 100 can capture stereoscopic images from other devices by using a wired and/or wireless communication method. Furthermore, stereoscopic images can also be obtained by the display apparatus 100 itself.

The controller 180 carries out the step of obtaining information of the user S30.

The user information may correspond to the information of a user viewing the display apparatus 100. For example, the user information may include at least one of basic information consisting of at least one of the user's age and gender and body information consisting of at least one of the user's height and distance between the eyes of the user.

The user information may be obtained in various ways. For example, the user information can be obtained through the camera (121 of FIG. 9) installed at the display apparatus 100, based on the information previously obtained, or through the user's mobile terminal (200 of FIG. 11). A method of obtaining the user's information will be described in detail at the corresponding part of this document.

The controller 180 carries out the step of changing attributes of stereoscopic images according to the user's information and displaying the stereoscopic images S50.

It may be the case that the degree of depth sensation due to a stereoscopic image has been already configured at the time of image capture. In other words, the situation above can be interpreted such that the stereoscopic image has been already transmitted to the display apparatus 100 being optimized for the user within a particular viewing range. For example, it means that the display apparatus 100 has been configured such that at the time of an adult user's viewing the display apparatus 100, he or she will get an optimized stereoscopic view.

Since the stereoscopic images are configured to provide a stereoscopic view optimized to the user staying within a particular viewing range, users outside of the range may not perceive any stereoscopic effect. For example, if a child views a stereoscopic image configured to provide a stereoscopic view optimized for adult users, the stereoscopic effect may be excessive for the child so that the child feels dizzy or does not feel a sufficient stereoscopic effect.

One of primary conditions for a person to perceive an optimized stereoscopic effect through stereoscopic images may be the distance between the eyes of the user viewing the display apparatus 100. The stereoscopic effect, as described above, is generated inherently due to the distance between the human eyes. Therefore, if the distance between the eyes of the user is different for individual users, the same stereoscopic images evoke stereoscopic effects different from each other.

The controller 180 can change the attributes of a stereoscopic image based on the user's information. In other words, according to the user's information, the stereoscopic image obtained may be changed in an appropriate manner. It means that the controller 180 is able to increase or decrease the stereoscopic effect of a stereoscopic image. For example, if the user viewing the display apparatus 100 is a child, the stereoscopic image is changed to accommodate the distance between the eyes of the child, whereas, if the user is an old person, the stereoscopic image is changed accordingly to accommodate the old person.

As the controller 180 changes the attributes of a stereoscopic image to be optimized for the user, the user is enabled to perceive a stereoscopic effect optimized for him or her. Furthermore, side effects such as dizziness developed as the stereoscopic effect of a stereoscopic image is not optimized can be avoided beforehand.

Figure 9:
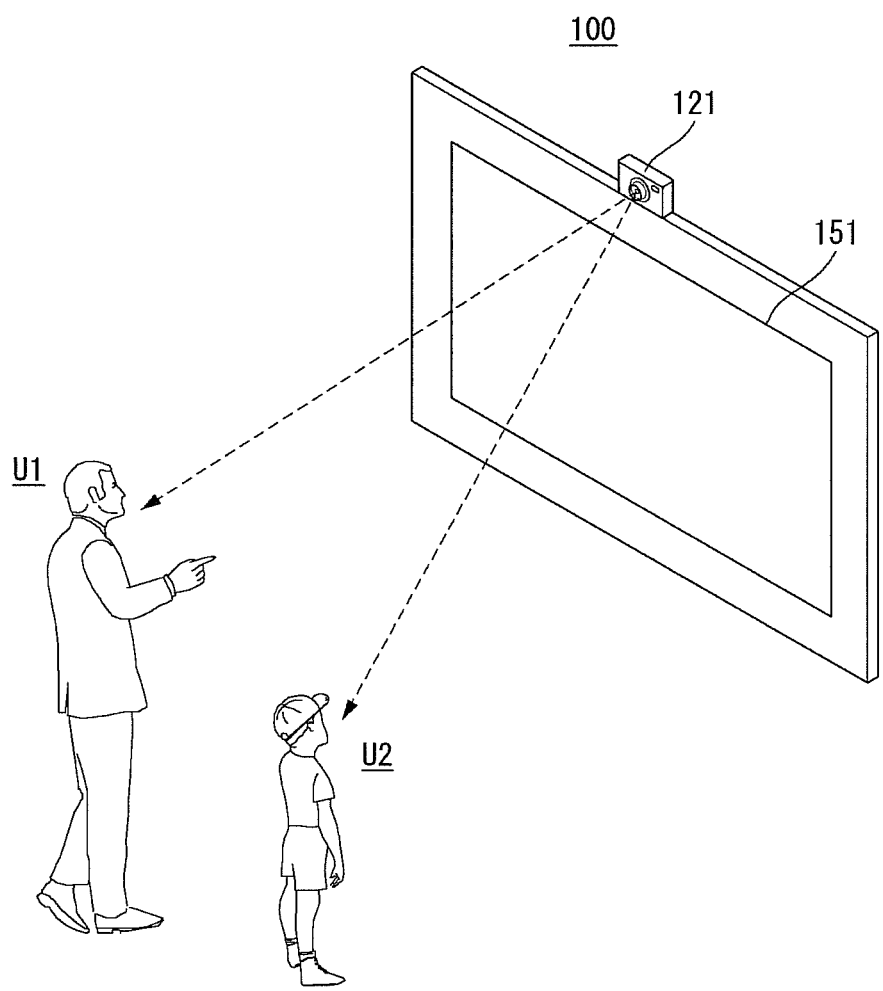
FIG. 9 illustrates an operating state of a display apparatus of FIG. 8.

FIG. 9 illustrates an operating state of a display apparatus of FIG. 8.

As shown in the figure, the display apparatus 100 according to one embodiment of the present invention may be equipped with a camera 121 capable of capturing information of the user U1, U2.

The camera 121 can capture the front image of the display apparatus 100.

The user U1, U2 viewing the display apparatus 100 may be included in the image captured through the camera 121.

The controller 180 can obtain the user's information based on the captured image of the user U1, U2. For example, based on the physique of the user extracted from the image of the user U1, U2, the age of the user U1, U2 can be estimated or the distance between the eyes of the user U1, U2 can be directly measured.

The controller 180, based on the user's information obtained, can change the attributes of a stereoscopic image. For example, based on the measured distance between the eyes of the user, the controller 180 can adjust the stereoscopic effect of the stereoscopic image to be larger and/or smaller.

The user U1, U2 may be plural. For example, an adult and a child may view the display apparatus 100 at the same time. In case of a plurality of users U1, U2, the controller 180 may change the attributes in such a way that the depth sensation of a stereoscopic image is adjusted for the user of early age. In other words, the display apparatus 100 may be operated based on the shortest distance between the eyes. Since the display apparatus 100 operates optimized for the user with a short distance between the eyes, a child viewing stereoscopic images may not feel dizzy.

Figure 10:
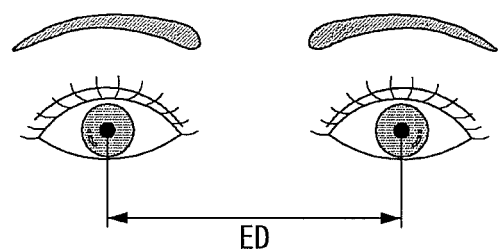
Figure 11:
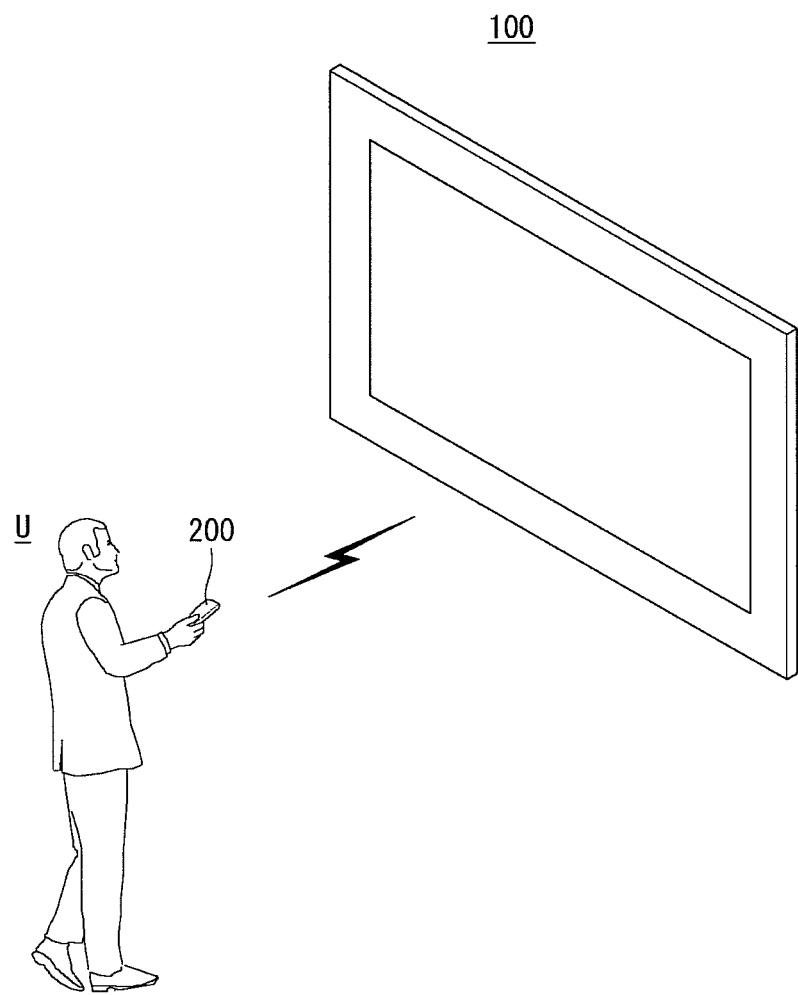

FIGS. 10 to 12 illustrate a method of identifying information of a user operating a display apparatus of FIG. 8.

As shown in the figure, the display apparatus 100 according to one embodiment of the present invention can obtain the information of the user in various ways.

As shown in FIG. 10, the controller 180 of the display apparatus 100 according to one embodiment of the present invention can obtain the eye distance (ED), which is the distance between the eyes of the user.

The eye distance (ED) can be obtained by analyzing the image of the user U1, U2 captured through the camera (121 of FIG. 9). For example, an image of a particular user U1, U2 can be extracted from the image captured and from the extracted image of the user U1, U2, the position of the user's head can be determined. In the head image, dark parts symmetric to each other may be determined as two eyes of the user. Moreover, in determining the eye region, the fact that two eyes are disposed symmetrically with respect to relatively bright forehead and nose may be employed.

As shown in FIG. 11, the display apparatus 100 according to one embodiment of the present invention can obtain information of the user from the user's mobile terminal 200.

The mobile terminal 200 may contain the user information. For example, basic information such as the user's age and gender may be contained in the mobile terminal 200. Furthermore, the mobile terminal 200 may further contain various pieces of body information including the user's height, weight, and the eye distance.

The display apparatus 100 can request the user information from the mobile terminal 200. For example, if an event such that the user approaches the display apparatus 100 within a predetermined radius, the display apparatus 100 may request the user information on the mobile terminal 200.

As shown in FIG. 12, the display apparatus 100 according to one embodiment of the present invention can estimate the eye distance of the user based on the user information obtained.

As shown in FIG. 12(a), the display apparatus 100 can obtain the information of a first U1 and a second user U2. For example, age and gender of each user U1, U2 can be obtained.

As shown in FIG. 12(b), if the user's age is identified, the eye distance corresponding to the age can be estimated. For example, statistical data exist describing the average eye distance such that the eye distance for 5 year old user is a; 8 year old user b; 12 year old user c; and 21 year old user d. The controller 180, based on the information of the user U1, U2 obtained, can provide stereoscopic images optimized for each user U1, U2. In other words, stereoscopic images can be changed based on the eye distance of each user U1, U2 and accordingly displayed.

Figure 13:
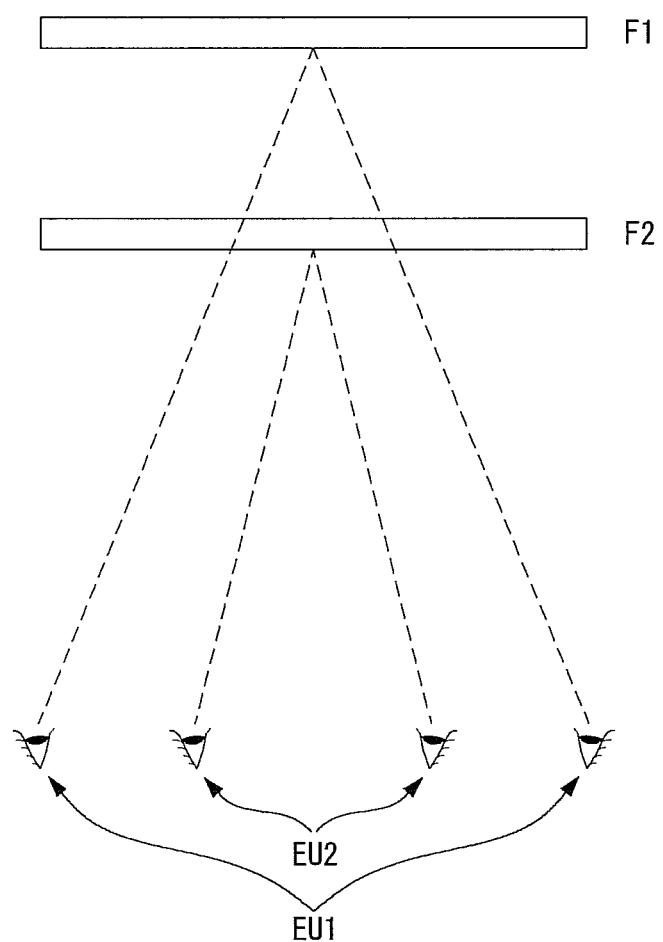
FIG. 13 illustrates variance of focal length according to a distance between the user's eyes.

FIG. 13 illustrates variance of focal length according to a distance between the user's eyes.

As shown in the figure, the controller 180 can adjust stereoscopic images according to the focal length varying according to the eye distance of the user.

A first user eye distance EU1 may be larger than a second user eye distance EU2. For example, the first user eye distance EU1 may correspond to an adult user while the second user eye distance EU2 to a child user.

Based on the first user eye distance EU1, focus is formed at a first position F1, while the focus is formed at a second position F2 according to the second user eye distance EU2. Therefore, depending on the eye distance of the user viewing the display apparatus 100, the same stereoscopic image may provide the user with a different impression of depth.

A stereoscopic image received may be optimized to the first user eye distance EU1. In other words, the display apparatus 100 may have been configured to provide the most natural impression of depth in case of the first user eye distance EU1. When a user with the second user eye distance EU2 views the same stereoscopic image as above, the user may feel the stereoscopic effect unnatural. In some case, if the user with the second user eye distance EU2 views the stereoscopic image configured for the first user eye distance EU1, the user with the second user eye distance EU2 may feel a symptom such as dizziness. The controller 180 of the display apparatus 100 according to one embodiment of the present invention can change the attribute of and display a stereoscopic image appropriately when the user with the second user eye distance views the stereoscopic image, even if the stereoscopic image had been configured based on the first user eye distance EU1. Therefore, the user can view optimized stereoscopic images without inconvenience to viewing.

Figure 14:
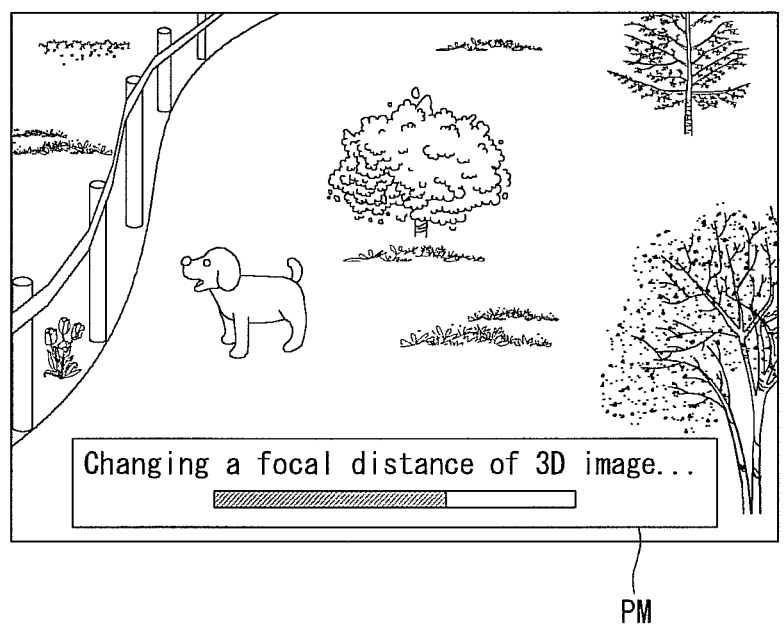
FIG. 14 illustrates a procedure of changing attributes of stereoscopic images according to the information of a user.

FIG. 14 illustrates a procedure of changing attributes of stereoscopic images according to the information of a user.

As shown in the figure, the controller 180 of the display apparatus 100 according to one embodiment of the present invention can display the progress of changing attributes of stereoscopic images on the display 151.

The controller 180 can display a current situation of changing attributes of a stereoscopic image on the display 151. For example, a PM can be displayed on the display 151. The PM can display a progress bar indicating a stereoscopic image being changed and/or status of changing the stereoscopic image. Since the PM is displayed, the user can clearly note the fact that the stereoscopic image is changing being optimized to him or her.

FIG. 15 shows restrictions applied to particular broadcasting programs.

As shown in the figure, the controller 180 of the display apparatus 100 according to one embodiment of the present invention can selectively restrict display of a particular broadcasting program.

There may exist a plurality of channels which can be displayed through the display apparatus 100. The user can selectively restrict display of a particular channel from among a plurality of channels. For example, it can be configured such that channel 5, 9, and 11 are viewed without restriction, while channel 35, an adult channel, is not allowed to the users of under age 19. The user can select allowed age and/or channel. The controller 180, based on the view restriction information configured by the user, can selectively display a channel.

The embodiment above described a case where viewing restriction is applied with respect to individual channels; however, the display apparatus 100 according to one embodiment of the present invention can configure viewing restriction for even more various situations. For example, the viewing restriction may be applied to a particular group of programs. In other words, it indicates that even though a particular channel is allowed for watching, viewing restriction may be applied to a particular program of the channel. Furthermore, viewing restriction can be applied selectively to the contents related to keywords predetermined by the user.

Figure 16:
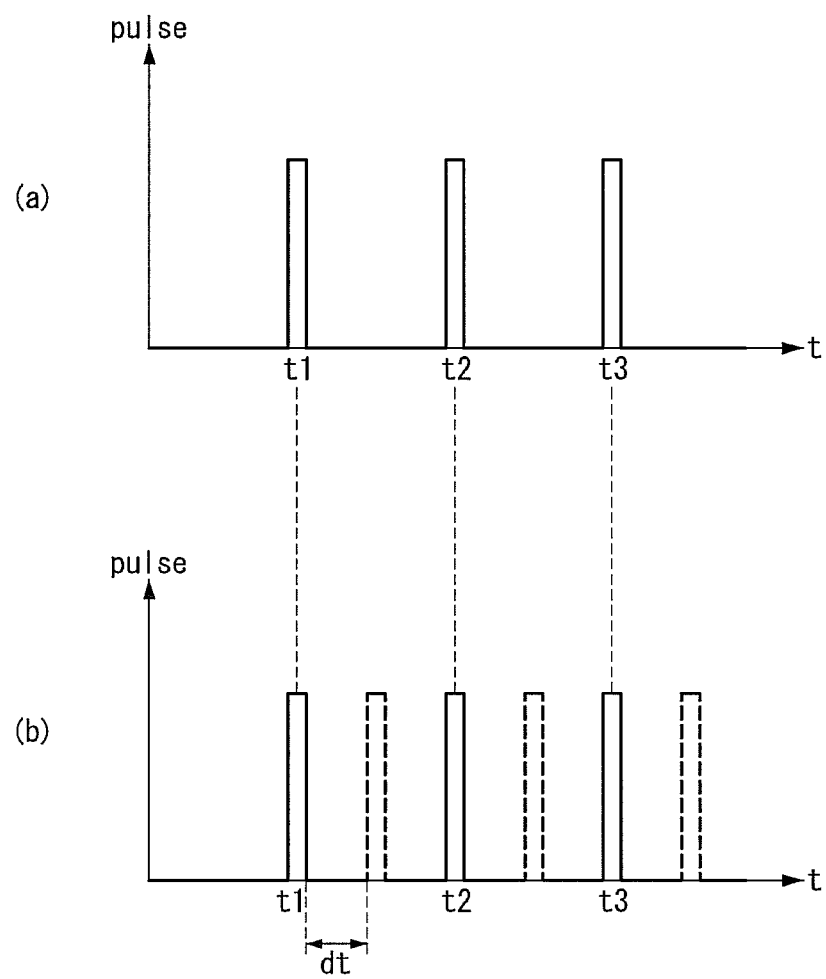
FIGS. 16 and 17 illustrate a method of signifying contents prohibited for watching.
Figure 17:
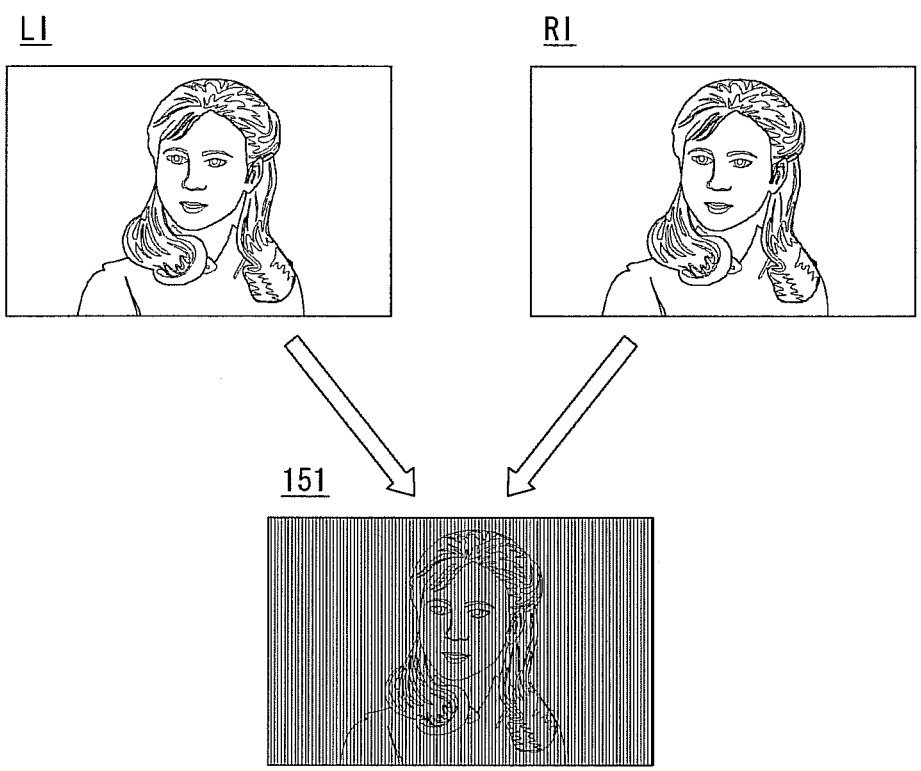

FIGS. 16 and 17 illustrate a method of signifying contents prohibited for watching.

As shown in the figure, the display apparatus 100 according to one embodiment of the present invention can be configured not to display stereoscopic images by avoiding left and right eye images to be synchronized to each other.

As shown in FIG. 16(a), a synchronization signal can be generated with a predetermined period. The controller 180, based on the synchronization signal, displays left and right eye images and thus the user can view stereoscopic images.

As shown in FIG. 16(b), the controller 180 can display the contents, channel, or program to which viewing restriction has been applied without synchronizing left and right eye images. In other words, it indicates that a time delay dt may exist between display of the left and right eye image. If a time delay dt is developed between the left and the right eye image, a resultant stereoscopic image may not be properly displayed. Therefore, it may effectively limit the user's viewing particular contents.

As shown in FIG. 17, the controller 180 can prohibit normal display of stereoscopic images by having the contents, channel, or program to which viewing restriction has been applied not aligned between the left and right eye images thereof.

Stereoscopic images can contain left (LI) and right eye images (RI).

The controller 180 can have stereoscopic images not displayed in a normal manner by deranging the left (LI) and the right eye images (RI). For example, by designating the center positions of the left LI and the right eye image RI to differ from each other, stereoscopic images can be made not to be displayed in a normal manner.

Figure 18:
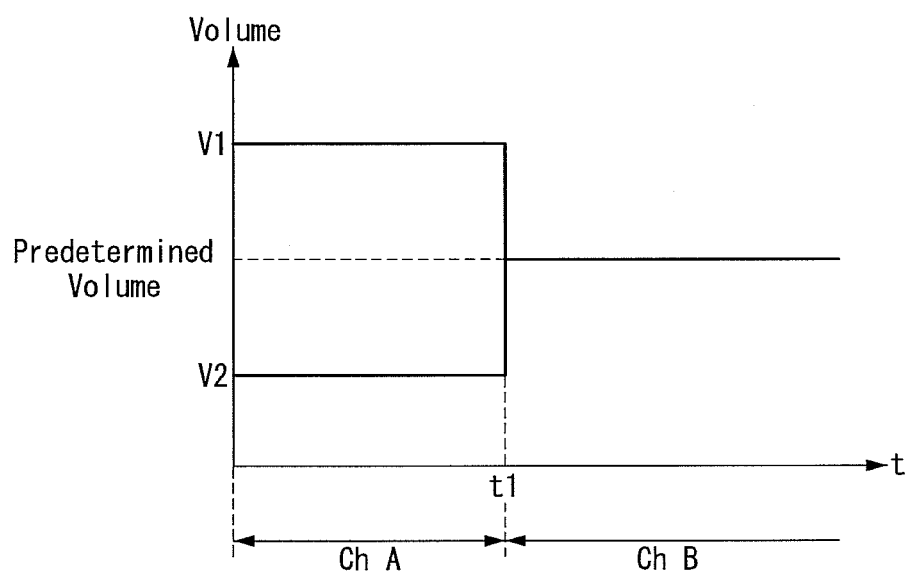
FIG. 18 illustrates changing the sound volume of a display apparatus of FIG. 1.

FIG. 18 illustrates changing the sound volume of a display apparatus of FIG. 1.

As shown in the figure, the display apparatus 100 according to one embodiment of the present invention can adjust its volume at the time when particular contents, a particular channel, or a particular program is displayed.

Prior to t1, the display apparatus 100 may be in a first volume state V1.

Starting from t1, the current channel may be changed from A to B.

If the channel is changed at the time point of t1, the controller 180 can change the volume from the first volume V1 to a predetermined volume. For example, suppose the channel A was providing a documentary program with relatively low sound while the channel B was providing a music program with relatively loud sound. Therefore, in order to balance the volume perceived by the user, the controller 180 may be able to switch to the predetermined volume from the first volume V1 the moment the current channel is changed. This kind of scenario can also be applied to a case where the current channel is changed to an adult channel at the time of t1.

As described above, the controller 180 can not only reduce the volume at a particular time point but also increase the volume to a predetermined volume from a second volume V2. Although the description has been provided with an assumption that the channel is changed at the time of t1, the description can still be applied to the case where particular contents, a particular program, and so on are changed at the time point of t1.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display apparatus, comprising:
a memory configured to store captured stereoscopic images;
a display configured to display the stored stereoscopic images; and
a controller configured to obtain at least one information of a user viewing the display and change attributes of the stereoscopic images according to the obtained information of the user and display the attribute-changed images,
wherein the controller is configured to change attributes of the stereoscopic images based on the obtained information of the user and configured view restriction information, and
wherein, when the user is not authorized to view the obtained stereoscopic images due to the configured view restriction information, the controller is configured to change the attributes so that one of a left eye image or a right eye image included in the obtained stereoscopic images is delayed with respect to the other to distort a display of the obtained stereoscopic images and display the attribute-changed images.

2. The apparatus of claim 1, wherein the user information includes at least one of basic information that includes at least one of the user's age or gender and body information that includes at least one of the user's height or distance between eyes of the user.

3. The apparatus of claim 1, further comprising a camera configured to capture external images, wherein the controller is configured to obtain information of the user from images of the at least one users included in the captured images.

4. The apparatus of claim 1, wherein, when the user is not authorized to view the obtained stereoscopic images due to the view restriction information, the controller is configured to change the attributes so that aligned positions of the left eye image or the right eye image included in the obtained stereoscopic images are changed and display the attribute-changed images.

5. The apparatus of claim 1, wherein the obtained stereoscopic images include first stereoscopic images before a particular time point and second stereoscopic images after the particular time point, wherein the controller is configured to change a sound volume from a first volume to a second volume in case the stereoscopic images are changed from the first stereoscopic images to the second stereoscopic images.

6. The apparatus of claim 5, wherein the second volume provides lower output than the first volume.

7. The apparatus of claim 1, wherein the controller is configured to obtain information of the user from a mobile terminal of the user.

8. The display apparatus of claim 1, wherein, when a number of users viewing the display is plural, the controller is configured to change attributes of the stereoscopic images to accommodate a user with the shortest distance between eyes among the plurality of users viewing the display and display the attribute-changed images.

9. A control method of a display apparatus, comprising:
obtaining stereoscopic images;
obtaining information of at least one user;
changing attributes of the obtained stereoscopic images according to the obtained information of the user and configured view restriction information; and
displaying the attribute-changed images,
wherein, when the user is not authorized to view the obtained stereoscopic images due to the configured view restriction information, the attributes are changed so that one of a left eye image or a right eye image included in the obtained stereoscopic images is delayed with respect to the other to distort a display of the obtained stereoscopic images and the attribute-changed images are displayed.

10. The method of claim 9, wherein the user information includes at least one of basic information that includes at least one of the user's age or gender, and body information that includes at least one of the user's height or distance between eyes of the user.

11. The method of claim 9, wherein the obtaining the information of the at least one user comprises:
capturing images by using a camera; and
obtaining information of a user from images of the at least one user included in the captured images.

12. The method of claim 9, the changing attributes of the stereoscopic images includes changing attributes of the stereoscopic images based on the obtained information of the user and the configured view restriction information, and displaying the attribute-changed images.

13. The method of claim 9, wherein, when the number of the users is plural, the method further comprising:
based on the obtained information of the plurality of users and the configured view restriction information, changing attributes of the stereoscopic images and displaying the attribute-changed images so that a particular user capable of viewing the stereoscopic images from among the plurality of users is allowed to view the stereoscopic images.

14. The method of claim 9, further comprising changing a sound volume from a first volume to a second volume in case the stereoscopic images are changed from the first stereoscopic images to the second stereoscopic images.

15. The display apparatus of claim 9, wherein, when the number of users viewing the display is plural, the controller detects a distance between the eyes for each of the plurality of users.

16. The method of claim 9, wherein, when a number of users viewing the display apparatus is plural, the attributes of the stereoscopic images is changed to accommodate a user with the shortest distance between eyes among the plurality of users viewing the display apparatus and displaying the attribute-changed images.

* * * * *